(12) United States Patent
Luo

(10) Patent No.: US 11,492,054 B2
(45) Date of Patent: Nov. 8, 2022

(54) BODY PART FOR A MOTOR VEHICLE WITH POSITIONING STRUCTURE

(71) Applicants: Compagnie Plastic Omnium, Lyons (FR); Yanfeng Plastic Omnium Automotive Exterior Systems Co., Ltd., Shanghai (CN)

(72) Inventor: Xiaohui Luo, Shanghai (CN)

(73) Assignees: Compagnie Plastic Omnium; Yanfeng Plastic Omnium Automotive Exterior Systems

( * ) Notice: Subject to any disclaimer, the term of this patent is extended or adjusted under 35 U.S.C. 154(b) by 1155 days.

(21) Appl. No.: 16/069,405

(22) PCT Filed: Jan. 11, 2017

(86) PCT No.: PCT/CN2017/070850
§ 371 (c)(1),
(2) Date: Jul. 11, 2018

(87) PCT Pub. No.: WO2017/121329
PCT Pub. Date: Jul. 20, 2017

(65) Prior Publication Data
US 2019/0002037 A1 Jan. 3, 2019

(30) Foreign Application Priority Data
Jan. 11, 2016 (CN) .......................... 201620021968.7

(51) Int. Cl.
*B62D 35/00* (2006.01)
*B62D 65/02* (2006.01)
(Continued)

(52) U.S. Cl.
CPC ........... *B62D 35/007* (2013.01); *B62D 37/02* (2013.01); *B62D 65/024* (2013.01); *B62D 65/16* (2013.01); *Y02T 10/82* (2013.01)

(58) Field of Classification Search
CPC .... B62D 35/007; B62D 37/02; B62D 65/024; B62D 65/15; B62D 65/16; Y02T 10/82
See application file for complete search history.

(56) References Cited

U.S. PATENT DOCUMENTS 4,577,843 A * 3/1986 Milwain .............. B23Q 1/4804
269/296
5,296,030 A * 3/1994 Young ................. B05B 13/0285
118/500
(Continued)

FOREIGN PATENT DOCUMENTS

CN 102465944 A 5/2012
CN 103183063 A 7/2013
(Continued)

OTHER PUBLICATIONS

European Search Report and Written Opinion for EP 17738143 dated Jul. 26, 2019.

*Primary Examiner* — Lori L Lyjak
(74) *Attorney, Agent, or Firm* — St. Onge Steward Johnston & Reens LLC

(57) ABSTRACT

A body part for a motor vehicle with a positioning structure is provided. The body part includes an outer panel and an inner panel, and a backside of the outer panel is provided with a positioning structure to position the outer panel relative to the inner panel for their assembly, the positioning structure including a clamping seat configured to receive a shaft of a rack for positioning the outer panel thereon during manufacturing of the outer panel, and to be engaged in an opening of the inner panel to position the outer panel relative to the inner panel. The positioning structure combines the arrangements of both positioning holes and positioning ribs, thereby greatly enhancing the eligibility rate of spray painting and welding stability.

14 Claims, 4 Drawing Sheets

(51) Int. Cl.
*B62D 37/02* (2006.01)
*B62D 65/16* (2006.01)

(56) References Cited

U.S. PATENT DOCUMENTS

| | | | | |
|---|---|---|---|---|
| 5,707,450 | A | * | 1/1998 | Thompson .......... B05B 13/0285 |
| | | | | 118/500 |
| 6,036,779 | A | * | 3/2000 | Tolbert ................ B05B 13/0285 |
| | | | | 118/500 |
| 6,409,128 | B1 | * | 6/2002 | Deshler .............. B05B 13/0285 |
| | | | | 248/125.1 |
| 6,530,620 | B1 | | 3/2003 | Turney et al. |
| 9,126,641 | B1 | * | 9/2015 | Sato ..................... B62D 35/007 |
| 9,315,091 | B1 | * | 4/2016 | Werling .................. B60R 13/04 |
| 2006/0137162 | A1 | * | 6/2006 | Shishikura .............. B23B 47/28 |
| | | | | 29/464 |
| 2009/0313782 | A1 | | 12/2009 | Chien |
| 2012/0013147 | A1 | * | 1/2012 | Ezaka ................ B29C 66/1142 |
| | | | | 296/181.5 |

FOREIGN PATENT DOCUMENTS

| | | |
|---|---|---|
| CN | 104364143 A | 2/2015 |
| CN | 205292826 U | 6/2016 |
| JP | 2006298229 A | 11/2006 |
| JP | 2009162242 A | 7/2009 |
| KR | 20120003255 U1 | 5/2012 |
| WO | WO2015033077 A1 | 3/2015 |

\* cited by examiner

BODY PART FOR A MOTOR VEHICLE WITH POSITIONING STRUCTURE

FIELD OF THE INVENTION

The present invention relates to a body part for a motor vehicle, and more particularly to a vehicle body part with a positioning structure.

BACKGROUND OF THE INVENTION

A body part for a motor vehicle is generally in assembled structure, comprising an outer panel 1 and an inner panel 2, for instance a spoiler installed in the rear of a vehicle as shown in FIG. 1. To ensure that the outer panel 1 has a colour identical with or matching that of the car body, the outer panel 1 must be hanged on a rack for spray painting during the production. In the prior art, a positioning hole 11 is arranged in the backside of the outer panel 1 and in an area adjacent to the edge, as shown in FIG. 2, thereby positioning the outer panel 1 on the rack through the positioning hole 11 for spray painting. Apparently, the positioning hole 11 used for positioning tends to be deformed easily, which may lead to a low eligibility rate of spray painting. Further, the positioning hole 11 is usually in small size, so that it is really hard to align the positioning hole 11 with the rack while hanging the outer panel 1 on the rack, which leads to difficulty in operation.

In the prior art, two positioning ribs 12 are arranged in the backside of the outer panel 1 and in an area adjacent to the edge, as shown in FIG. 3. The cross-section of the positioning rib is triangle-shaped, as shown in FIG. 4. During the operation, the outer panel 1 and the inner panel 2 must be fixed through welding. Apparently, the positioning ribs 12 used for positioning tend to be deflected. To be specific, the two broadsides of the positioning rib 12 have a great inclination. During the welding operation, once the inner panel 2 is deflected backward, the welding will result in dislocation of the inner panel 2 relative to the outer panel 1, thereby leading to a bad gap d1 between the spoiler and the vehicle roof and a bad gap d2 between the spoiler and a rear windshield, as shown in FIG. 5.

SUMMARY OF THE INVENTION

To address such problems in the prior art as easy deformation of the positioning holes and as imprecise positioning by the positioning ribs, the present invention is to provide a body part for a motor vehicle with one combined positioning structure integrating the functions of both the positioning holes and the positioning ribs.

According to the present invention, the body part for a motor vehicle, comprising an outer panel and an inner panel, characterized in that a backside of the outer panel is provided with a positioning structure to position the outer panel relative to the inner panel for their assembly, the positioning structure comprising a clamping seat configured both:
- to receive a shaft of a rack for positioning the outer panel thereon during manufacturing of the outer panel, and
- to be engaged in an opening of the inner panel to position the outer panel relative to the inner panel.

In a preferred embodiment of the present invention, the body part comprises a plate spaced from the backside of the outer panel, and the plate is connected to the backside of the outer panel such that the plate is inclined so that it is configured to clamp the shaft of the rack.

In a further preferred embodiment of the present invention, the clamping seat comprises a housing having a first end with a first length and a second end with a second length that is greater than the first length, the second end being provided with an opening, through which the shaft of the rack can be inserted. The term "length" here means the distance to the backside of the outer panel.

Advantageously, the clamping seat comprises a plate spaced from the backside of the outer panel, the plate being connected to the backside of the outer panel by four legs, wherein the first leg and the second leg have a substantially equal first length, and the third leg and the fourth leg have a substantially equal second length that is greater than the first length.

Advantageously, the plate is quadrangular.

Advantageously, the four legs are arranged substantially perpendicular to the backside of the outer panel.

The first length ranges advantageously from 3 mm to 8 mm.

The second length ranges advantageously from 5 mm to 10 mm.

An opening is advantageously located between the third leg and the fourth leg.

In a preferred embodiment of the present invention, the inner panel comprises a first position-limiting rib and a second position-limiting rib, a position-limiting opening is formed between the first position-limiting rib and the second position-limiting rib.

Advantageously, the clamping seat protrudes through the position-limiting opening.

Advantageously, the first end (or the first leg and the second leg) abuts against the first position-limiting rib, and the second end (or the third leg and the fourth leg) abuts against the second position-limiting rib.

The four legs are advantageously arranged substantially perpendicular to the backside of the outer panel.

The positioning structure of the present invention combines the arrangements of both the positioning holes and the positioning ribs in the prior art. The positioning structure acts on the one hand a clamping seat for its positioning on the painting rack and on the other hand a positioning rib used for the pre-positioning of the inner panel relative to the outer panel before their welding assembly. Moreover, the structural configuration of the positioning structure provide an easier and more stable positioning effect for both operations of placing the outer panel on the rack and pre-assembling the inner panel with the outer panel, thereby greatly enhancing the eligibility rate of spray painting and welding stability. In addition, the positioning structure of the present body part may support the body part by four legs, which is structurally strength and has a good positioning effect.

The invention is also to provide a method of assembling a body part for a motor vehicle as presented above, comprising the following steps:
- the clamping seat first receives the shaft of the rack for positioning the outer panel thereon during manufacturing of the outer panel, and
- the clamping seat is then engaged in the opening of the inner panel to position the outer panel relative to the inner panel.

Advantageously, the positioning of the outer panel relative to the inner panel and a final assembly between them can be obtained by means of bonding, tape gluing, or welding.

DETAILED DESCRIPTION OF THE INVENTION

The preferred embodiment of the present invention will be described in detail for a rear spoiler of a motor vehicle with reference to the drawings. It can be understood that other examples for a vehicle body part consisting of an outer panel and an inner panel which are assembled together, such as a front/rear bumper, a tailgate, or a door, etc., fall within the protection scope of the present invention.

Figure 1:
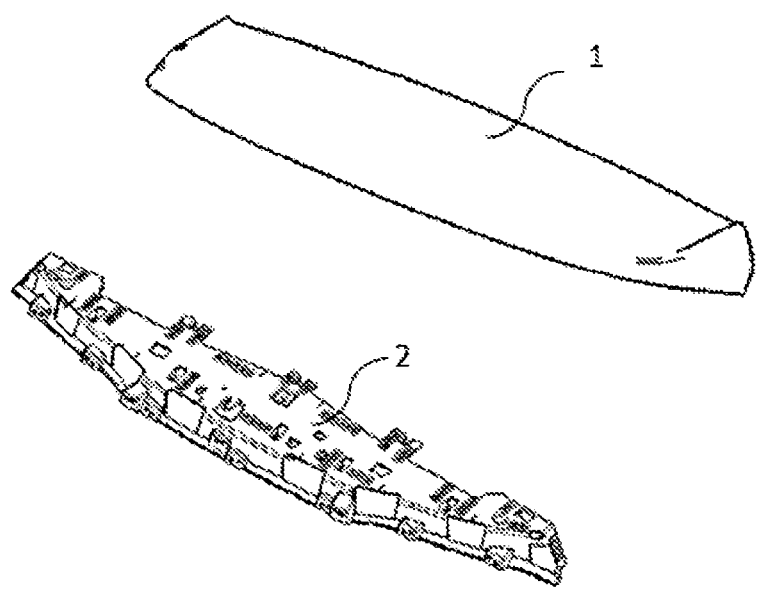
FIG. 1 is an exploded view of a body part of the prior art.
Figure 2:
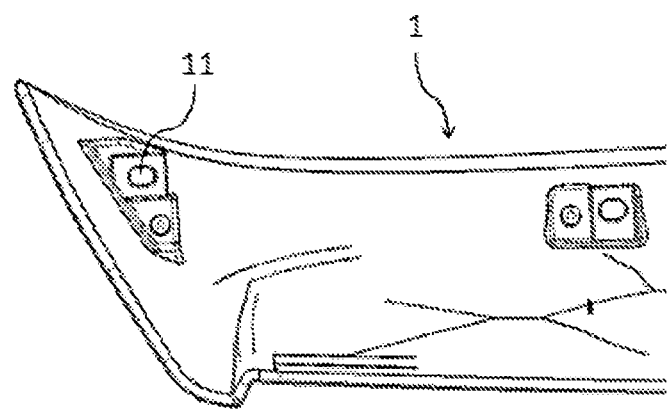
FIG. 2 a is positioning hole in the backside of an outer panel of the body part in the prior art.
Figure 3:
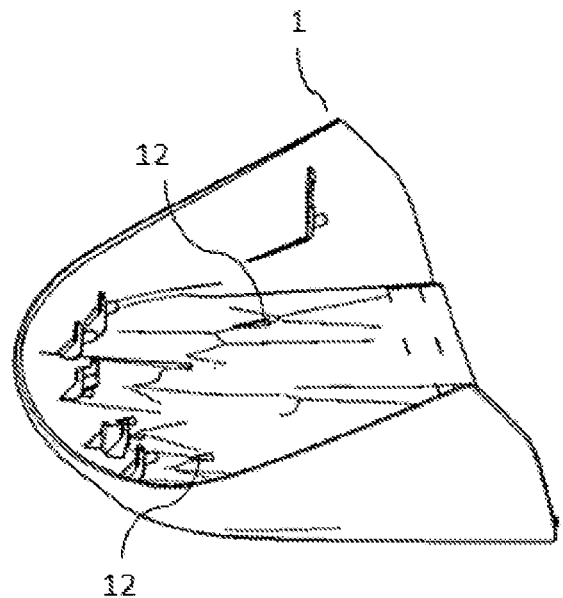
FIG. 3 shows positioning ribs in the backside of the outer panel of the body part in the prior art.
Figure 4:
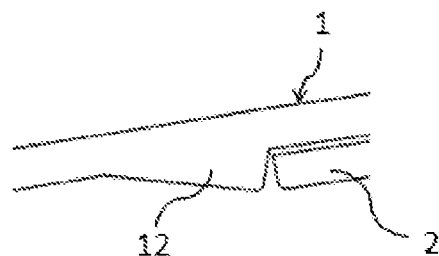
FIG. 4 is a cross-sectional view of the positioning of the outer panel and an inner panel of the body part in the prior art.
Figure 5:
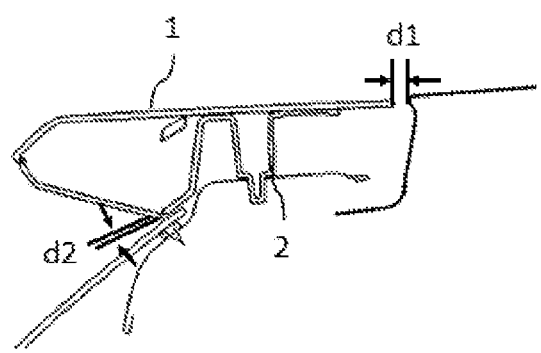
FIG. 5 shows a gap between the body part and a vehicle roof, as well as a gap between the body part and a rear windshield in the prior art.
Figure 6:
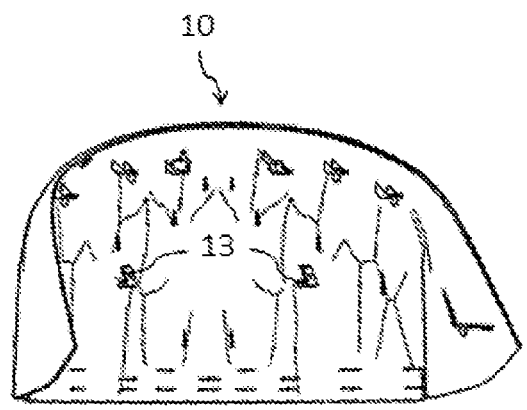
FIG. 6 is a schematic view of the backside of the outer panel of the body part according to the present invention.

FIG. 6 is a schematic view of the backside of the outer panel of the spoiler according to the present invention. The backside of the outer panel 10 is provided with two symmetric clamping seats 13.

Figure 7:
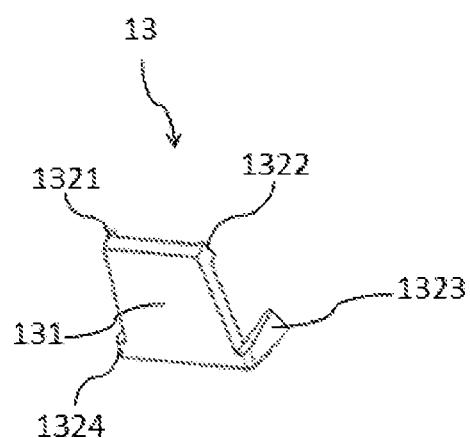
FIG. 7 is a schematic view of a clamping seat of the outer panel of the body part according to the present invention.

FIG. 7 is an enlarged view of the clamping seat. The clamping seat 13 comprises a quadrangular plate 131 spaced from the backside of the outer panel 10, and the quadrangular plate 131 is connected to the backside of the outer panel 10 by four legs 1321, 1322, 1323, 1324, wherein the first leg 1321 and the second leg 1322 have a substantially equal first length, the third leg 1323 and the fourth leg 1324 have a substantially equal second length that is greater than the first length. In the present embodiment, the first length ranges from 3 mm to 8 mm, the second length ranges from 5 mm to 10 mm, and the four legs are arranged substantially perpendicular to the backside of the outer panel 10.

Figure 8:
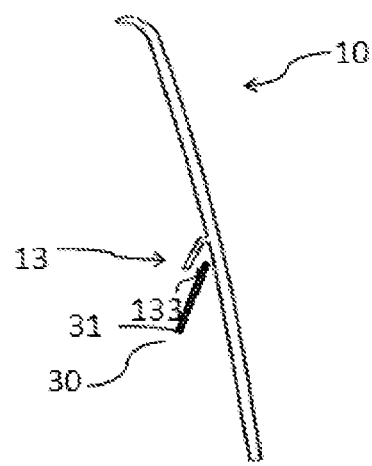
FIG. 8 is a cross-sectional view of the positioning of the clamping seat of the outer panel of the body part according to the present invention on a rack for spray painting.

FIG. 8 is a cross-sectional view of the positioning of the clamping seat 13 of the outer panel 10 of the spoiler according to the present invention on a rack 30 for spray painting. The body of the rack 30 is omitted in the drawing, and only an insertion shaft 31 of the rack 30 is shown. When the outer panel 10 is placed on the rack from top to bottom, the insertion shaft 31 is inserted into an opening 133 between the third leg 1323 and the fourth leg 1324 such that a free end of the insertion shaft 31 is located between the quadrangular plate 131 and the outer panel 10, for the sake of holding. Apparently, during the positioning by the rack with the help of the clamping seat 13 of the present invention, the spray painting process is rendered more stable due to large contact area, high strength and undeformed structure. Moreover, since the opening 133 is relatively large and arranged downward, an operator who holds the outer panel 10 can still hang the outer panel 10 on the rack 30 without seeing the insertion shaft 31.

Figure 9:
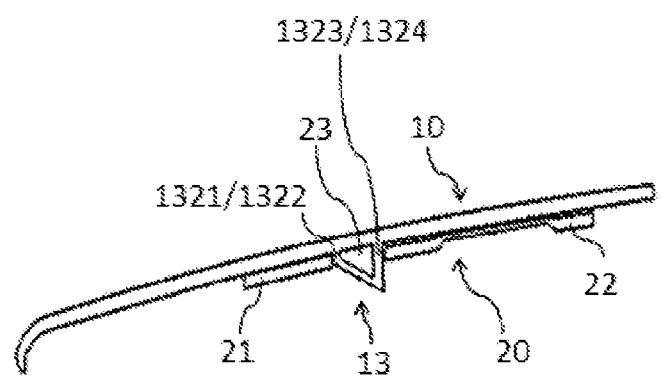
FIG. 9 is a cross-sectional view of the positioning of the clamping seat of the outer panel of the body part according to the present invention with an inner panel.

FIG. 9 is a cross-sectional view of the positioning of the clamping seat 13 of the outer panel 10 of the spoiler according to the present invention with the inner panel 20. The inner panel 20 has a first position-limiting rib 21 and a second position-limiting rib 22, between which there exists a position-limiting opening 23. The clamping seat 13 of the outer panel 10 protrudes from the position-limiting opening 23. The first leg 1321 and the second leg 1322 abut against the first position-limiting rib 21, and the third leg 1323 and the fourth leg 1324 abut against the second position-limiting rib 22, for the sake of holding. Apparently, during the welding with the help of the clamping seat of the present invention, the positioning is more precise and relative displacement will not occur easily because the clamping seat has a large contact angle with respect to the inner panel 20. Moreover, the position-limiting rib in the prior art must be demolded in a direction identical with the demolding direction of the outer panel, the positioning rib shall not have a large height and angle, thereby leading to a poor positioning effect. However, the clamping seat 13 of the present invention is demolded during its formation by a separately designed slide block, such that the height and angle thereof can be adjusted independently, thereby guaranteeing the positioning effect and finally ensuring that the gap d1 between the spoiler and the car roof and the gap d2 between the spoiler and the rear windshield are constant.

The above contents are merely preferred embodiments of the present invention and not intended to limit the scope of the present invention. Variations can be made to the above embodiments of the present invention. Any simple and equivalent variation and modification made according to the claims and description of the present invention falls within the protection scope of the claims of the present invention. Conventional techniques are not described in detail in the present invention.

The invention claimed is:

1. A body part for a motor vehicle, comprising an outer panel and an inner panel, wherein a backside of the outer panel is provided with a positioning structure to position the outer panel relative to the inner panel for their assembly, the positioning structure comprising a clamping seat configured both:
   to receive a shaft of a rack for positioning the outer panel thereon during manufacturing of the outer panel, and
   to be engaged in an opening of the inner panel to position the outer panel relative to the inner panel;
   wherein the clamping seat comprises a plate spaced from the backside of the outer panel, the plate being connected to the backside of the outer panel by four legs, wherein the first leg and the second leg have a substantially equal first length, and the third leg and the fourth leg have a substantially equal second length that is greater than the first length.

2. The body part according to claim 1, wherein the clamping seat comprises a plate spaced from the backside of the outer panel , the plate being connected to the backside of the outer panel such that the plate is inclined so that it is configured to clamp the shaft of the rack.

3. The body part according to claim 1, wherein the clamping seat comprises a housing having a first end with a first length and a second end with a second length that is greater than the first length, the second end being provided with an opening.

4. The body part according to claim 1, wherein the plate is quadrangular.

5. The body part according to claim 1, wherein the four legs are arranged substantially perpendicular to the backside of the outer panel.

6. The body part according to claim 3, wherein the first length ranges from 3 mm to 8 mm.

7. The body part according to claim 3, wherein the second length ranges from 5 mm to 10 mm.

8. The body part according to claim 1, wherein the inner panel comprises a first position-limiting rib and a second position-limiting rib, and a position-limiting opening is formed between the first position-limiting rib and the second position-limiting rib.

9. The body part according to claim 8, wherein the clamping seat protrudes through the position-limiting opening.

10. The body part according to claim 8, wherein a first end of a housing of the clamping seat abuts against the first position-limiting rib, and a second end of the housing of the clamping seat abuts against the second position-limiting rib.

11. Method of assembling a body part for a motor vehicle, comprising the following steps:
providing the body part for a motor vehicle, comprising an outer panel and an inner panel, wherein a backside of the outer panel is provided with a positioning structure to position the outer panel relative to the inner panel for their assembly, the positioning structure comprising a clamping seat;
first receiving at the clamping seat the shaft of the rack for positioning the outer panel thereon during manufacturing of the outer panel; and
then engaging the clamping seat in the opening of the inner panel to position the outer panel relative to the inner panel
wherein the clamping seat comprises a plate spaced from the backside of the outer panel, the plate being connected to the backside of the outer panel by four legs, wherein the first leg and the second leg have a substantially equal first length, and the third leg and the fourth leg have a substantially equal second length that is greater than the first length.

12. Method of assembling a body part for a motor vehicle according to claim 11, wherein the positioning of the outer panel relative to the inner panel and a final assembly between them can be obtained by bonding, tape gluing, or welding.

13. A body part for a motor vehicle, comprising an outer panel and an inner panel, wherein a backside of the outer panel is provided with a positioning structure to position the outer panel relative to the inner panel for their assembly, the positioning structure comprising a clamping seat configured both:
to receive a shaft of a rack for positioning the outer panel thereon during manufacturing of the outer panel, and
to be engaged in an opening of the inner panel to position the outer panel relative to the inner panel;
wherein the inner panel comprises a first position-limiting rib and a second position-limiting rib, and a position-limiting opening is formed between the first position-limiting rib and the second position-limiting rib; and
wherein a first end of a housing of the clamping seat abuts against the first position-limiting rib, and a second end of the housing of the clamping seat abuts against the second position-limiting rib.

14. The body part according to claim 13, wherein the clamping seat protrudes through the position-limiting opening.

* * * * *

UNITED STATES PATENT AND TRADEMARK OFFICE
CERTIFICATE OF CORRECTION

| | |
|---|---|
| PATENT NO. | : 11,492,054 B2 |
| APPLICATION NO. | : 16/069405 |
| DATED | : November 8, 2022 |
| INVENTOR(S) | : Xiaohui Luo |

It is certified that error appears in the above-identified patent and that said Letters Patent is hereby corrected as shown below:

On the Title Page

In item (71), Line 1 Compagnie Plastic Omnium, Lyons – should be changed to Compagnie Plastic Omnium, Lyon

Signed and Sealed this
Twenty-first Day of February, 2023

*Katherine Kelly Vidal*

Katherine Kelly Vidal
*Director of the United States Patent and Trademark Office*